(12) United States Patent
Menheere et al.

(10) Patent No.: US 12,338,748 B1
(45) Date of Patent: Jun. 24, 2025

(54) INTEGRATED AXIAL COMPRESSOR DIFFUSER AND HIGH PRESSURE TURBINE VANE ASSEMBLY

(71) Applicant: Pratt & Whitney Canada Corp., Longueuil (CA)

(72) Inventors: Dave Menheere, Norval (CA); Eduardo Hawie, Woodbridge (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/541,549

(22) Filed: Dec. 15, 2023

(51) Int. Cl.
*F01D 9/04* (2006.01)
*F01D 5/18* (2006.01)

(52) U.S. Cl.
CPC .............. *F01D 9/041* (2013.01); *F01D 5/18* (2013.01); *F05D 2220/32* (2013.01); *F05D 2240/128* (2013.01)

(58) Field of Classification Search
CPC ..... F01D 9/00; F01D 9/02; F01D 9/04; F01D 9/041; F01D 9/042; F01D 5/18; F01D 5/187; F01D 25/08; F01D 25/12; F05D 2240/128; F05D 2220/32
See application file for complete search history.

(56) References Cited

U.S. PATENT DOCUMENTS

| | | | |
|---|---|---|---|
| 2,611,241 A | 9/1952 | Schulz | |
| 3,269,120 A | 8/1966 | Sabatiuk | |
| 3,703,081 A * | 11/1972 | Krebs | F02K 3/068 415/214.1 |
| 6,453,674 B1 | 9/2002 | Rakhmailov | |
| 6,647,707 B2 | 11/2003 | Dev | |
| 11,092,025 B2 | 8/2021 | Harris | |
| 11,168,613 B2 | 11/2021 | Aoyama et al. | |
| 2004/0025490 A1 | 2/2004 | Paul | |
| 2007/0022738 A1 | 2/2007 | Norris et al. | |
| 2007/0116562 A1 * | 5/2007 | West | F01D 9/047 415/208.1 |
| 2009/0255943 A1 * | 10/2009 | Giljohann | B64F 5/30 220/666 |
| 2019/0128190 A1 * | 5/2019 | Aoyama | F02C 7/18 |

OTHER PUBLICATIONS

Extended European Search Report for EP Application No. 24218876.1, dated Apr. 28, 2025, pp. 1-10.

* cited by examiner

*Primary Examiner* — Elton K Wong
(74) *Attorney, Agent, or Firm* — CANTOR COLBURN LLP (57) ABSTRACT

Gas turbine engines include a compressor section configured to compress a core flow and a combustor section having a combustor that is arranged downstream from the compressor section along a path of the core flow. A turbine section is arranged downstream from the combustor along the path of the core flow, and includes a plurality of first vanes arranged at an outlet of the combustor, with at least one first vane of the plurality of first vanes having an internal vane path. A compressor diffuser is arranged to direct the core flow from the compressor section through the internal vane path. The path of the core flow, in a flow direction, passes through the compressor section, the compressor diffuser, the internal vane path, the combustor, and then between the first vanes of the plurality of first vanes to enter the turbine section.

18 Claims, 5 Drawing Sheets

INTEGRATED AXIAL COMPRESSOR DIFFUSER AND HIGH PRESSURE TURBINE VANE ASSEMBLY

BACKGROUND

The subject matter disclosed herein generally relates to components for turbine engines and, more particularly, to compressor, combustor, and turbine arrangements of turbine engines.

Aircraft engines, such as gas turbine engines, typically include a fan to generate an airflow to be passed into an engine core and may direct a portion or a significant portion of the air around the engine core as a bypass flow. The engine core typically includes, in a direction from forward to aft, the fan, a compressor section, a combustor section, and a turbine section. Typically, the combustor must follow the compressor axially such that compressed air from the compressor section is directed into and mixed with fuel for combustion within one or more combustors of the combustor section. Due to the configurations and components of each section of the engine core, the axial length of the engine cannot be shortened. Further, in operation, a relatively large compressor may be required to provide thorough cooling throughout the engine core. Bleed cooling flow may enter into the core gas path. Bleed air cooling of high-pressure turbine (HPT) vanes of the turbine section in current configurations necessarily reduces the amount of cool air available for cooling the combustor and for combustion. That is, a portion of the cooling air, taken from the compressor section, may be diverted around the combustor section to provide cooling to the vanes of the turbine section. The amount of air for cooling the vanes of the turbine section can be over 15% of core flow, which must be compensated for in the design process by increasing the core size.

SUMMARY

According to embodiments of the present disclosure, gas turbine engines are provided. The gas turbine engines include a compressor section configured to compress a core flow, a combustor section having a combustor arranged downstream from the compressor section along a path of the core flow, and a turbine section arranged downstream from the combustor along the path of the core flow. The turbine section includes a plurality of first vanes arranged at an outlet of the combustor, with at least one first vane of the plurality of first vanes having an internal vane path. A compressor diffuser is arranged to direct the core flow from the compressor section through the internal vane path. The path of the core flow, in a flow direction, passes through the compressor section, the compressor diffuser, the internal vane path, the combustor, and then between the plurality of first vanes to enter the turbine section.

In addition to one or more of the features described above, or as an alternative, further embodiments of the gas turbine engines may include that at least a portion of the compressor section is arranged radially inward from the combustor and at the same axial position as the combustor along an engine axis.

In addition to one or more of the features described above, or as an alternative, further embodiments of the gas turbine engines may include that the portion of the compressor arranged radially inward from the combustor is part of a high pressure compressor.

In addition to one or more of the features described above, or as an alternative, further embodiments of the gas turbine engines may include that the portion of the compressor arranged radially inward from the combustor is a high pressure compressor.

In addition to one or more of the features described above, or as an alternative, further embodiments of the gas turbine engines may include that the combustor is arranged within a combustor cavity and the internal vane path fluidly connects the compressor diffuser with the combustor cavity.

In addition to one or more of the features described above, or as an alternative, further embodiments of the gas turbine engines may include that the combustor cavity comprises an outer subcavity, a forward subcavity, and an inner subcavity, wherein compressed air supplied through the internal vane path fills each of the outer subcavity, the forward subcavity, and the inner subcavity.

In addition to one or more of the features described above, or as an alternative, further embodiments of the gas turbine engines may include that the inner subcavity is defined in a radial direction relative to an engine axis between an outer diameter surface of a part of the compressor section and an inner diameter surface of the combustor.

In addition to one or more of the features described above, or as an alternative, further embodiments of the gas turbine engines may include that the path of the core flow is in an axially aft direction through the compressor section, turned in a radially outward direction by the compressor diffuser, and flows radially outward through the internal vane path.

In addition to one or more of the features described above, or as an alternative, further embodiments of the gas turbine engines may include that the core flow path is turned to flow radially forward relative to the engine axis as it exits the internal vane path to surround the combustor and provide air thereto.

In addition to one or more of the features described above, or as an alternative, further embodiments of the gas turbine engines may include that each first vane of the plurality of first vanes includes an internal vane path.

In addition to one or more of the features described above, or as an alternative, further embodiments of the gas turbine engines may include that the compressor diffuser is arranged axially aft of the combustor relative to an engine axis.

In addition to one or more of the features described above, or as an alternative, further embodiments of the gas turbine engines may include a fan arranged axially forward of the compressor section and configured to direct the core flow into the compressor section.

In addition to one or more of the features described above, or as an alternative, further embodiments of the gas turbine engines may include that the fan is configured to direct a bypass flow an engine core that includes the compressor section, combustor section, and turbine section.

In addition to one or more of the features described above, or as an alternative, further embodiments of the gas turbine engines may include that the bypass flow is greater than the core flow.

In addition to one or more of the features described above, or as an alternative, further embodiments of the gas turbine engines may include that the compressor section comprises a low pressure compressor and a high pressure compressor, wherein the high pressure compressor is axially aft of the low pressure compressor relative to an engine axis.

In addition to one or more of the features described above, or as an alternative, further embodiments of the gas turbine engines may include that at least a portion of the high pressure compressor is arranged axially aligned with the combustor and radially inward from the combustor.

In addition to one or more of the features described above, or as an alternative, further embodiments of the gas turbine engines may include that the turbine section comprises a low pressure turbine and a high pressure turbine, wherein the high pressure turbine is axially forward of the low pressure turbine relative to an engine axis.

In addition to one or more of the features described above, or as an alternative, further embodiments of the gas turbine engines may include that the plurality of first vanes are a plurality of first vanes of the high pressure turbine.

According to some embodiments, methods of operating gas turbine engines are provided. The gas turbine engines include a compressor section, a combustor section, and a turbine section, with at least a portion of the compressor section arranged axially aligned with a combustor of the combustor section and radially inward from the combustor. The method includes compressing air of a core flow through the compressor section in an axially aft direction relative to an engine axis, turning the compressed air in a radial outward direction with a compressor diffuser, passing the compressed air through an internal vane path of at least one first vane of a plurality of first vanes of the turbine section as a radial direction flow, receiving the compressed air within the combustor to generate hot combustion gas, and directing the hot combustion gas between the plurality of first vanes and into the turbine section.

In addition to one or more of the features described above, or as an alternative, further embodiments of the methods may include that the core flow path is turned to flow radially forward relative to the engine axis as it exits the internal vane path to surround the combustor and provide air thereto.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
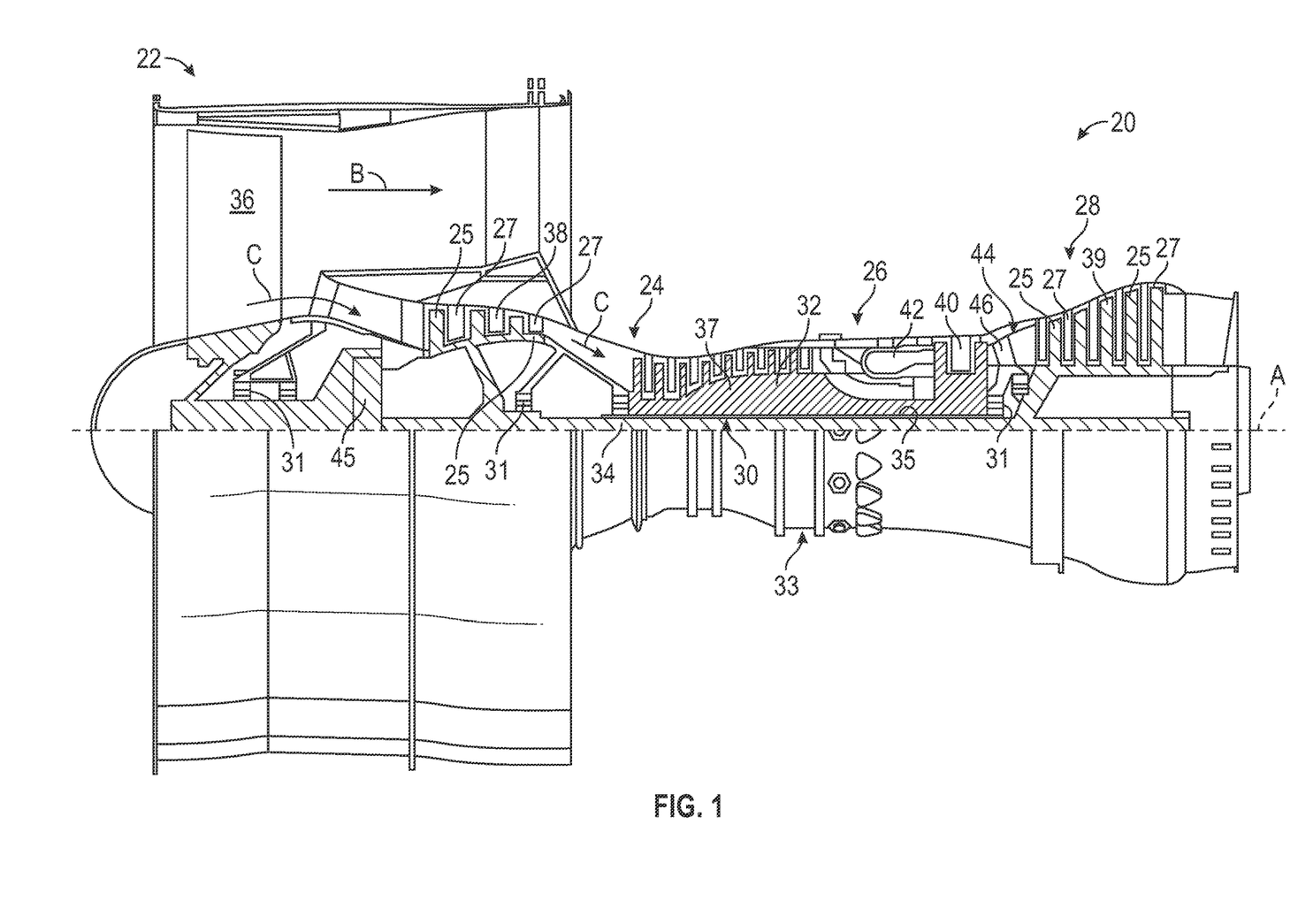
FIG. 1 is a schematic cross-sectional illustration of an aircraft turbine engine that may incorporate embodiments disclosed herein.

FIG. 1 schematically illustrates a gas turbine engine 20. The illustrative, example gas turbine engine 20 is a two-spool turbofan engine that generally incorporates a fan section 22, a compressor section 24, a combustor section 26, and a turbine section 28. The fan section 22 drives air along a bypass flow path B, while the compressor section 24 drives air along a core flow path C for compression and communication into the combustor section 26. The core flow path C directs compressed air into the combustor section 26 for combustion with a fuel. Hot combustion gases generated in the combustor section 26 are expanded through the turbine section 28. Although depicted as a turbofan gas turbine engine, it should be understood that the concepts described herein are not limited to turbofan engines and these teachings could extend to other types of engines.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded across the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, a bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In an embodiment of the gas turbine engine 20, a significant amount of thrust may be provided by the bypass flow path B due to the high bypass ratio. The fan section 22 of the gas turbine engine 20 is designed for a particular flight condition-typically cruise at about 0.8 Mach and about 35,000 feet (10,668 meter). This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(T_{ram}° R)/(518.7° R)]^{0.5}$, where $T_{ram}$ represents the ambient temperature in degrees Rankine. The Low Corrected Fan Tip Speed according to one non-limiting embodiment of the example gas turbine engine 20 is less than about 1150 feet per second (fps) (351 meters per second (m/s)).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

As shown in FIG. 1, the combustor 42 of the combustor section 26 is arranged axially aft (downstream) of the compressor section 24 and is arranged axially forward (upstream) of the turbine section 28. This axial arrangement is provided, in part, to ensure that the turbine section 28 and the compressor section 24 are operably connected or coupled by the inner shaft 34 and/or the outer shaft 35. As discussed above, the inner shaft 34 interconnects the fan 36, the low pressure compressor 38, and the low pressure turbine 39 and the outer shaft 35 interconnects the high pressure compressor 37 and the high pressure turbine 40. The combustor 42 is arranged axially between the compressor section 24 and the turbine section 28 and receives compressed air from the compressor section 24 and expels combustion output into the turbine section 28 to drive operation of the turbines of the turbine section 28. It may be advantageous to shorten the axial length of an engine core, and such modifications may require rearrangement of components of the turbine engine core.

For example, in accordance with embodiments of the present disclosure, an engine core is provided with an alternative arrangement of the compressor and combustor sections/components thereof. In accordance with the present disclosure, a compressor diffuser is integrated with a high-pressure turbine blade assembly. This integration of a compressor diffuser can reduce or eliminate bleed cooling flow into the gas path. Further, in such a configuration, the compressor air may be used for back face and/or internal cooling of the vanes of the high pressure turbine (e.g., first stage turbine vanes). The process of cooling the high pressure turbine vanes can add energy in the form of heat to the compressed air before the compressed air enters the combustor for combustion, which can improve combustor efficiency. To achieve such an airflow/cooling scheme, the compressor section (or a portion thereof) may be arranged radially inward from the combustor.

That is, in accordance with embodiments of the present disclosure, an axial compressor can be arranged with the final compressor stages under (radially inward from) the combustor, thus shortening an overall engine length, improving shaft dynamics, and reducing weight. In accordance with some embodiments, the axial compressor is arranged with a conventional high pressure turbine vane shape. In some embodiments, the axial and/or radial length of the high pressure turbine vane can be extended, as needed, to meet volume requirements for compressor outflow. With such axial compressor arranged radially inward from the combustor, the cool flow from the compressor flows through the vanes of the high pressure turbine and then surrounds the combustor where it can enter the combustor for combustion. The cool air flowing through the vanes of the high pressure turbine will provide cooling to the vanes from an internal passage within the vanes and then the hot flow from the combustor flows between the high pressure turbine vanes (e.g., interacts with exterior surface of the vanes).

Figure 2:
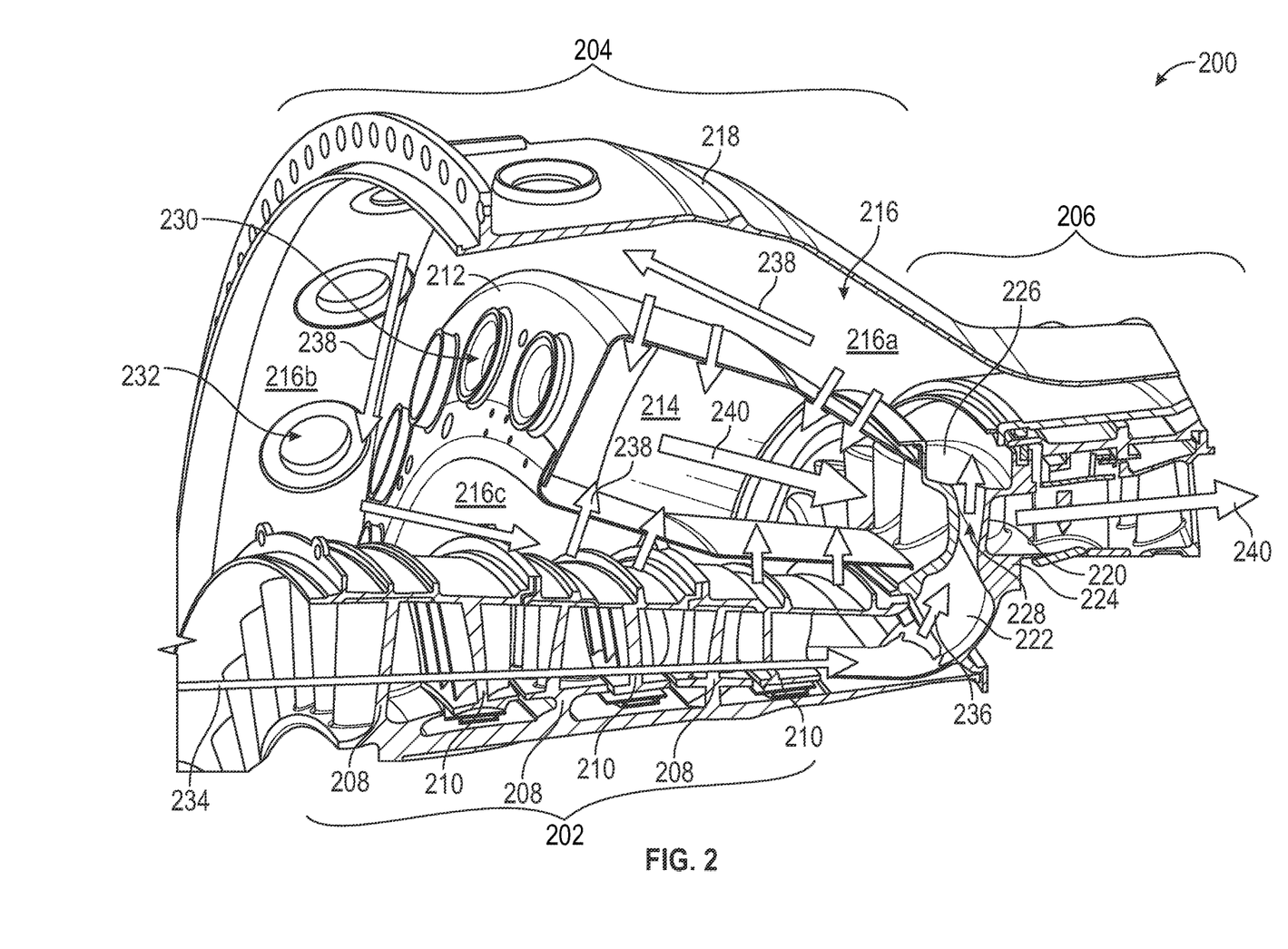
FIG. 2 is a schematic illustration of a portion of a gas turbine engine in accordance with an embodiment of the present disclosure.

Referring now to FIG. 2, a schematic illustration of a portion of a gas turbine engine 200 in accordance with an embodiment of the present disclosure is shown. The gas turbine engine 200 may be arranged similar to that shown and described above, having a fan section at a forward end of the engine, and then, along a core flow path (e.g., air and combustion products) a compressor section 202, a combustor section 204, and a turbine section 206. The fan, not shown, maybe arranged axially forward (or upstream) of the compressor section 202 and additional turbine section structure and/or a nozzle may be arranged axially aft (or downstream) of the illustrative turbine section 206. As described above, the compressor section 202 and the turbine section 206 may be operably connected by one or more spools or shafts, with a fan arranged at a forward end of at least one of the spools/shafts.

As shown in FIG. 2, the compressor section 202 is arranged inward from the combustor section 204. The compressor section 202 includes a set of blades 208 and vanes 210. The combustor section 208 includes a combustor 212 defining a combustion chamber 214 arranged within a combustor cavity 216. At least the final compressor blade 208 and final compressor vane 210 (e.g., final compressor stage) is arranged radially inward from the combustor 212. In this illustrative embodiment, at least two of the stages (sets of blades 208 and vanes 210) are arranged radially inward from the combustor 212, and in other embodiments more than two stages of the compressor section 202 may be arranged radially inward from the combustor 212. It will be appreciated that the compressor section 202 of this illustrative embodiment is representative of a high pressure compressor. In some embodiments and engine core configurations, the entire high pressure compressor (all stages) may be arranged radially inward from the combustor 212. In other embodiments, less than the total high pressure compressor may be arranged radially inward from the combustor 212. As described herein, and as shown, at least a portion of the compressor section 202 and the combustor section 204 are axially aligned, but radially separated.

As noted, the combustor section 204 includes the combustor 212 which defines the combustion chamber 214. The combustor 212 is arranged within the combustor cavity 216 which defines a volume where air from the compressor section 202 may be directed and subsequently enters the combustor 212. As shown, the combustor cavity 216 may be defined in three regions. The combustor cavity 216 may be defined having an outer subcavity 216a, a forward subcavity 216b, and an inner subcavity 216c. Each of the subcavities 216a-c are connected and substantially continuous (i.e., not separated by structures). Rather, the outer subcavity 216a is a volume or space of the combustor cavity 216 that is radially outward from the combustor 212 defined between an outer surface of the combustor 212 (surface of the outer diameter of the combustor 212) and an inner surface of an engine case 218. The forward subcavity 216b is a volume or space of the combustor cavity 216 that is axially forward of the combustor 212, and may be forward bounded by a bulkhead, wall, panel, or the like (not shown for clarity) and aft bounded by a forward end of the combustor 212. The inner subcavity 216c is a volume or space of the combustor cavity 216 that is radially inward from the combustor 212 and is defined between a surface of the inner diameter of the combustor 212 and an outer or radially outward surface of the compressor section 202.

Aft of the combustor section 204 is the turbine section 206 which includes blades and vanes, as will be appreciated by those of skill in the art. The turbine section 206 includes a set of first vanes 220 that is arranged at an outlet of the combustion chamber 214. As such, a set of the vanes (first vanes 220) of the turbine section 206 are arranged immediately at the outlet of the combustion chamber 214 and are arranged to turn and direct the combustion materials into a first blade of the turbine section 206 to drive rotation of a shaft or spool, as will be appreciated by those of skill in the art.

In this illustrative configuration, a compressor diffuser 222 is arranged an outlet or downstream end of the compressor section 202. The compressor diffuser 222 is a curved portion arranged axially aft of both the compressor section 202 and the combustor section 204, and is arranged radially inward from the first vanes 220 of the turbine section 206. The first vanes 220 are airfoil structures that extend in a radial direction between an inner diameter platform 224 at a radially inward position and an outer diameter platform 226 at a radially outward position. The first vanes 220 each define a hollow interior or internal vane path 228 that extends in a radial direction from the inner diameter platform 224 to the outer diameter platform 226. The compressor diffuser 222 is defined between an outlet of the compressor section 202 and the inner diameter platform 224 of the turbine section 206.

The compressor diffuser 222 provides a fluid path and turning of flow of compressed air in a radially outward direction and through the first vanes 220. That is, the compressed air from the compressor section 202 is directed radially outward through the compressor diffuser 222 and the internal vane path 228 defined within the first vanes 220. The air will then enter the outer subcavity 216a of the combustor cavity 216 and surround the combustor 212 and enter the combustion chamber 214 from the surrounding subcavities 216a-c. The air entering the combustion chamber 214 may be through impingement holes and/or effusion holes that are defined on the panels that define the combustion chamber 214, as will be appreciated by those of skill in the art. As shown in FIG. 2, the combustor 212 includes fuel injector mounts 230 for mounting fuel injectors (not shown). The fuel injectors or associated structures/components may be installed into the combustor cavity 216 through apertures 232 in the engine case 218, as will be appreciated by those of skill in the art.

In operation, a fan will be rotationally driven to direct airflow into the engine, such as core flow through the engine core and bypass flow that is diverted around the engine core. In the portion of the gas turbine engine 200 illustrated in FIG. 2, air 234 (e.g., of a core flow path C shown in FIG. 1) is directed into the compressor section 202. It will be appreciated that in some configurations, a low pressure compressor may be arranged forward of the compressor section 202 shown in FIG. 2, and the compressor section 202 may thus be representative of a high pressure compressor of the gas turbine engine 200. Compressed air 236 exits the compressor section 202 and enters the compressor diffuser 222 and is directed radially outward through the internal vane path 228. The compressed air 236 will provide cooling to the internal surfaces of the airfoils of the first vanes 220. The compressed air 236 will then exit into the combustor cavity 216 at the outer diameter platform 226 as combustion supply air 238. The combustion supply air 238 will fill the combustor cavity 216 (and the subcavities 216a-c thereof) and surround the combustor 212. The combustion supply air 238 will enter the combustion chamber 214 through various mechanisms (e.g., impingement and/or effusion holes) and mix with fuel to be combusted within the combustion chamber 214 of the combustor 212. The mixed fuel and air will be combusted into a combustion product 240 which is then directed through an outlet at the aft end of the combustor 212 and through (between) the first vanes 220 of the turbine section 206.

As such, in accordance with embodiments of the present disclosure, a core air flow through a gas turbine engine will pass through a compressor section 202, be rotated and diffused through a compressor diffuser 222 and through a passage 228 that is defined internally to first vanes 220 of a turbine section 206. The core air flow will then fill a combustor cavity 216 and enter a combustion chamber 214 of a combustor 212. The core air flow will mix with a fuel to be combusted within the combustion chamber 214 and then pass between the first vanes 220 (again) of the turbine section 206 and then flow downstream through the whole turbine section of the gas turbine engine 200.

Figure 3:
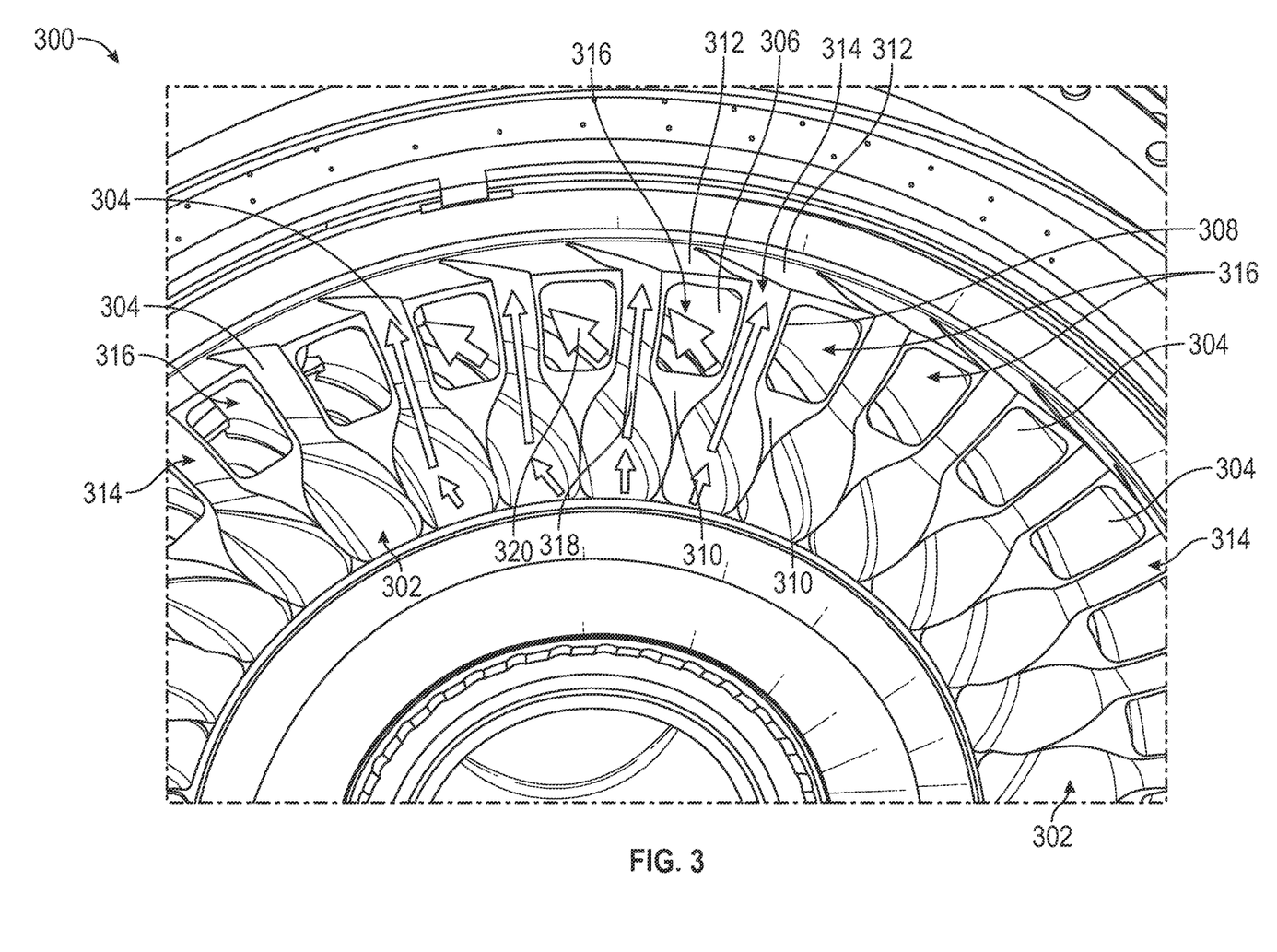
FIG. 3 is a schematic illustration of a portion of a gas turbine engine in accordance with an embodiment of the present disclosure.

Referring now to FIG. 3, a schematic illustration of a portion of a gas turbine engine 300 in accordance with an embodiment of the present disclosure is shown. The gas turbine engine 300 may be arranged similar to that shown and described with respect to FIG. 3. Further, the gas turbine engine 300 may include a fan section at a forward end of the engine, and then, along a core flow path (e.g., air and combustion products) a compressor section, a combustor section, and a turbine section. As described above, the compressor section and the turbine section may be operably connected by one or more spools or shafts, with a fan arranged at a forward end of at least one of the spools/shafts.

The illustration of FIG. 3 is a detailed or enlarged illustration of a portion of a compressor diffuser 302 and set of first vanes 304 in accordance with an embodiment of the present disclosure. As shown, each first vane 304 includes a first sidewall 306 and a second sidewall 308. The sidewalls 306, 308 may be curved and define an airfoil structure that extends radially between an inner diameter platform 310 and an outer diameter platform 312. The sidewalls 306, 308 may define pressure and suction sides of the first vanes 304 to provide a turning to air as it flows between circumferentially adjacent first vanes 304. Each first vane 304 defines an internal vane path 314. The internal vane path 314 is a hollow interior of each vane between the sidewalls 306, 308. The sidewalls 306, 308 may join together at a leading edge and a trailing edge of each vane, thus enclosing the internal vane path 314 between the leading edge, the trailing edge, the pressure side-side wall, and the suction side-side wall of the vane structure. Arranged between adjacent first vanes 304 are core flow paths 316, which are defined by the external surfaces of the sidewalls 306, 308 of the first vanes 304.

FIG. 3 illustrates that relatively cool, compressed air 318 will flow in a radially outward direction through the compressor diffuser 302 and into and through the internal vane path 314. The cool, compressed air 318 can provide internal cooling to the sidewalls 306, 308 and then exit at the outer diameter platform 312 and enter a combustor cavity, such as shown and described with respect to FIG. 2. The cool, compressed air 318 will then enter a combustor (not shown) and be combusted within a combustion chamber of the combustor. The combusted air and fuel mixture 320 (e.g., hot gas) will exit through combustion chamber through the core flow paths 316 defined between the first vanes 304 and then flow downstream through a turbine section of the gas turbine engine 300. As such, cooling to the first vanes 304 is provided directly from the compressor section that is fluidly upstream from the compressor diffuser 302 (e.g., as shown in FIG. 2). Accordingly, bleeding air from the compressor to redirect such air to the first vanes 304 is not required, and thus losses or inefficiencies associated with such bleed air may be reduced or eliminated.

The illustrative configuration shown in FIGS. 2-3 provides for a gas turbine engine having a combustor section arranged radially outward from at least a portion of a compressor section. For example, in some embodiments, the combustor may be arranged such that it axially overlaps with at least the last stage of a high pressure compressor, which is arranged radially inward from the combustor. Rather than directly supplying compressed air from the compressor directly into the combustor chamber in an axial flow direction, the compressed air is turned from an axial flow through the compressor to a radial flow direction that is turned by a compressor diffuser and passed through an internal cavity or passage of first stage vanes of a high pressure turbine, and then directed in a substantially forward to surround and fill a combustor cavity. The cool, compressed air can provide internal cooling to the vanes as it passes through the vanes. The cool, compressed air will then enter the combustion chamber for mixture and combustion with fuel, injected by a fuel injector into the combustion chamber. The hot gas combustion output is then directed between the first stage vanes and turned to drive rotation of disks of a turbine, as will be appreciated by those of skill in the art.

Figure 4A:
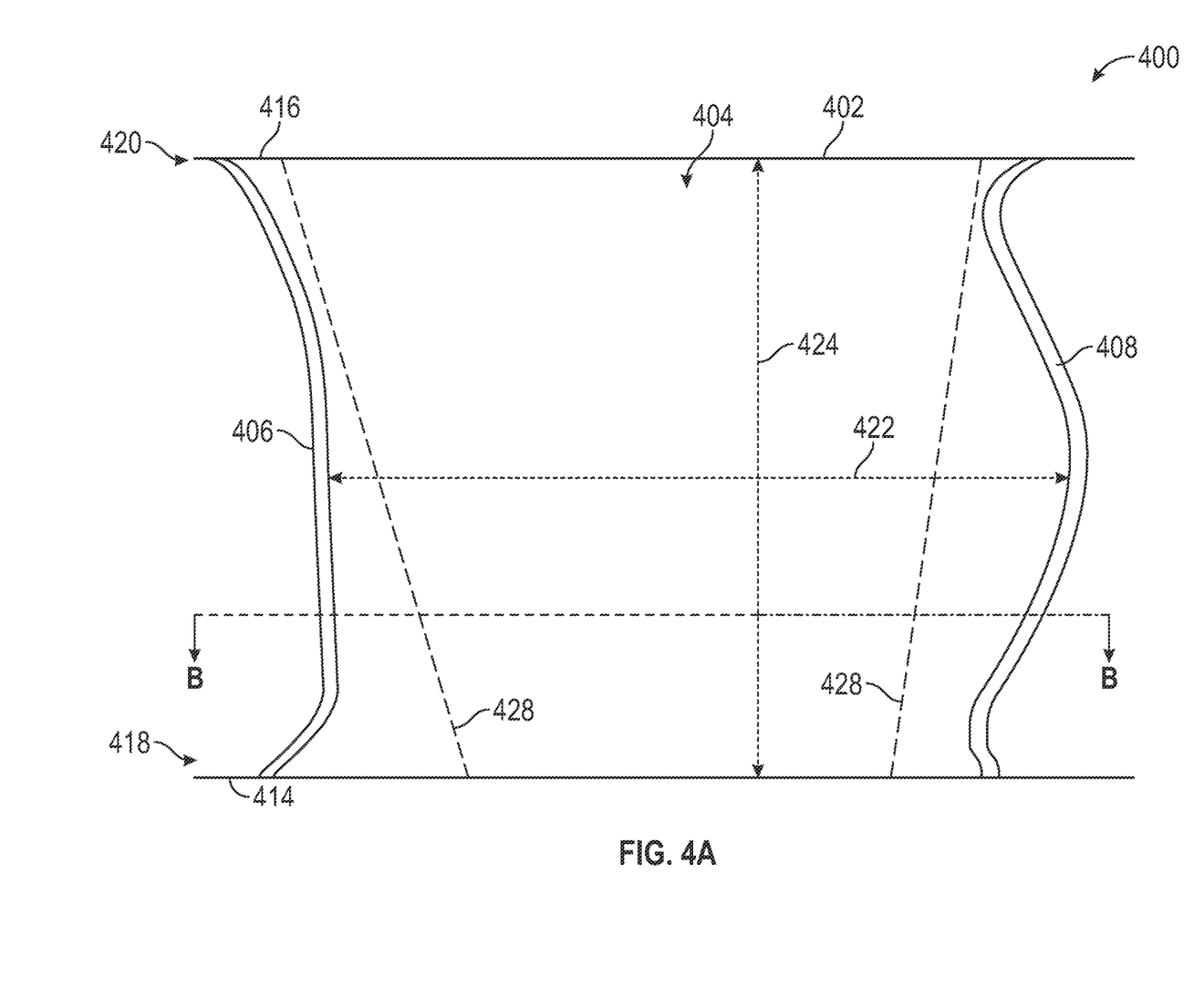
FIG. 4A is a schematic illustration of a vane in accordance with an embodiment of the present disclosure.
Figure 4B:
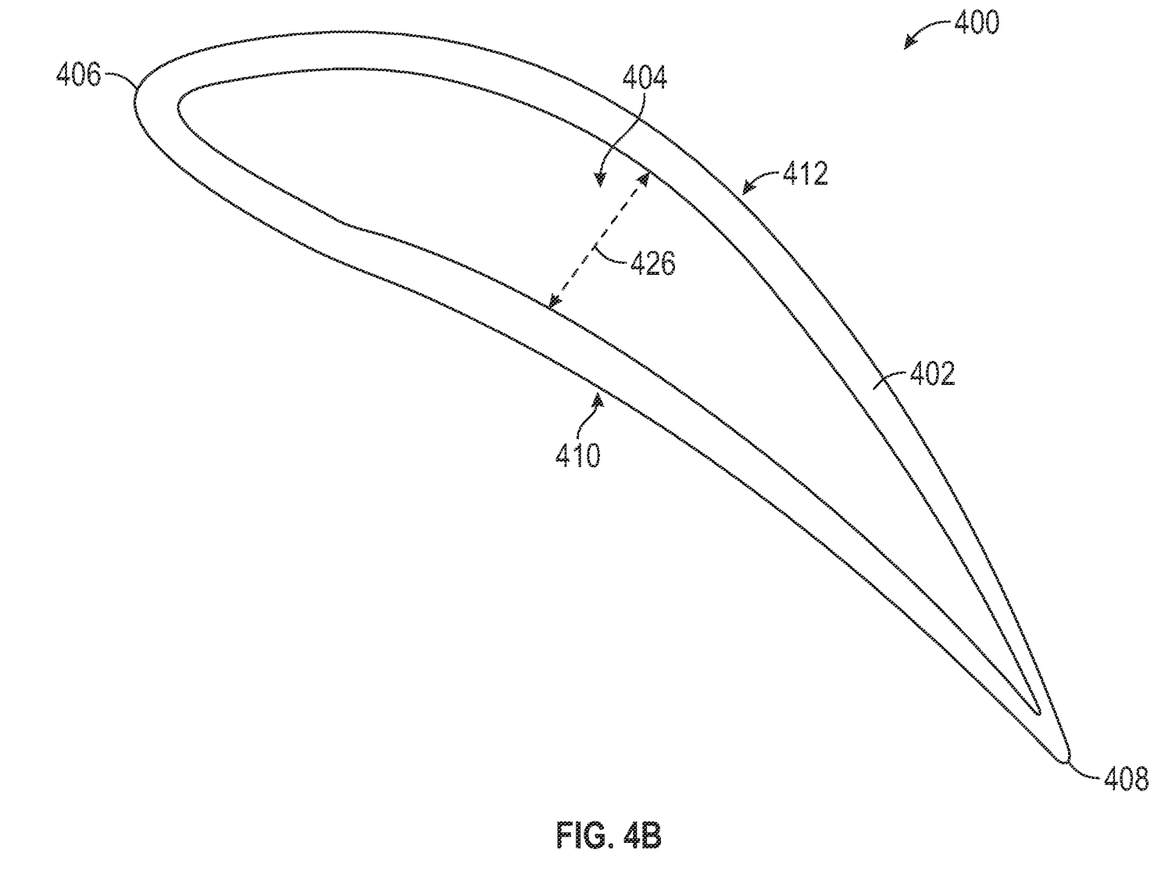
FIG. 4B is a cross-sectional illustration of the vane of FIG. 4A viewed along the line B-B of FIG. 4A.

Referring now to FIGS. 4A-4B, schematic illustrations of a first vane 400 of a turbine section of a gas turbine engine in accordance with an embodiment of the present disclosure are shown. FIG. 4A is a side elevation view of the vane 400 and FIG. 4B is a cross-sectional view along the line B-B shown in FIG. 4A. The vane 400 defines an interior hollow body structure (airfoil body 402) with an internal vane path 404 (e.g., airfoil cavity). The internal vane path 404 is defined within the structure or body of the vane 400. With reference to both FIGS. 4A and 4B, the vane 400 includes a leading edge 406 and a trailing edge 408, with a pressure side wall 410 and a suction side wall 412 extending in a substantially axial direction (relative to engine axis) from the leading edge 404 to the trailing edge 406.

As shown in FIG. 4A, the airfoil body 402 extends in a substantially radial direction (relative to engine axis) between an inner diameter platform 414 and an outer diameter platform 416. At an inner diameter end 418 of the airfoil body 402, the internal vane path 404 is open and may be fluidly connected to a compressor diffuser, such as shown and described above. Incoming compressed air may enter the internal vane path 404 at the inner diameter end 418 and pass through the interior of the airfoil body 402, and thus provide cooling to the interior surfaces of the vane 400. The compressed air will then exit the internal vane path 404 at an outer diameter end 420 through an opening in the outer diameter platform 416.

As noted above, the amount of airflow directed from the compressor section through the internal vane paths of the vanes of the present disclosure may be controlled or accommodated by adjusting features of the first vanes of the turbine sections of the engine. For example, the vane 400 has an axial length 422, a radial height 424, and a circumferential width 426. Each of the vane dimensions 422, 424, 426 may be adjusted to accommodate the necessary airflow that is output from an upstream compressor section and operation of the downstream combustor. For example, one or both of the axial length 422 and the circumferential width 426 may be increased to increase a total cross-sectional area of the internal vane path 404, and thus permit a larger volume of flow through the internal vane path 404. Consideration may also be given for the amount of cooling provided to the internal surfaces of the airfoil body 402 to ensure heat pickup and removal is achieved by a compressed air flow through the internal vane path 404.

Furthermore, in accordance with some embodiments, the dimensions of the of the internal vane path 404 may not be uniform in a flow direction. For example, as noted above, the internal vane path 404 may be part of a diffusion system, where the compressed air begins to expand and diffuse as it passes through the internal vane path 404. Accordingly, in some embodiments, the axial length 422 and/or the circumferential width 426 may be narrower or smaller at the inner diameter end 418 than the respective axial length 422 and/or circumferential width 426 at the outer diameter end 420. Stated another way, the cross-sectional area of the internal vane path 404 may gradually increase from the inner diameter end 418 to the outer diameter end 420, and thus define or provide a diffusing structure directly within the first vane 400. Such narrow inner diameter and wider outer diameter is illustrated by dashed-lines 428 shown in FIG. 4A. In some such configurations, the material of the airfoil body 402 at the inner diameter end 418 may be thicker than the material at the outer diameter end 420. In other configurations, the structure of the airfoil body 402 may be narrowed as well, such that the distance between the leading edge 406 and the trailing edge 408 at the inner diameter end 418 is less than the distance between the leading edge 406 and the trailing edge 408 at the outer diameter end 420.

Advantageously, embodiments described herein provide for gas turbine engines with modified arrangements that provide for improved cooling, improved efficiencies, and reduced axial length, among other benefits and features. With respect to cooling, as noted above, the compressor air is directed into the compressor diffuser and then into and through an internal passage of the turbine section. This direct cooling avoids the need for bleeding compression air and routing it to cool the vanes. That is, the compressed air, as it flows from the compressor diffuser to the combustion cavity around the combustor will also provide cooling to the turbine vanes. With respect to efficiencies, because less (or no) bleed air is required, a smaller engine configuration may be possible. For example, in a conventional, axially arranged engine, over 15% of core flow may be extracted from the compressor section and routed around the combustor section to supply cooling air to the turbine vanes. However, advantageously, by directly routing the entire core flow through the interior of the turbine vanes, cooling is applied directly thereto without the need for any bleed air for cooling. Accordingly, up to 15% or greater efficiency in terms of bleed air may be achieved.

As noted, a reduced axial length of the engine core may be achieved by implementation of embodiments of the present disclosure. For example, by arranging a portion of the compressor section to be axially aligned with a portion of the combustor section of the engine, but arranged radially inward from the combustor section, the total length of the engine may be reduced. For example, and without limitation, the engine core may be reduced in length by up to 6 inches or more.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. As used herein, the terms "about" and "substantially" are intended to include the degree of error associated with measurement of the particular quantity based upon the equipment available at the time of filing the application. For example, the terms may include a range of +8%, or 5%, or 2% of a given value or other percentage change as will be appreciated by those of skill in the art for the particular measurement and/or dimensions referred to herein. It should be appreciated that relative positional terms such as "forward," "aft," "upper," "lower," "above," "below," and the like are with reference to normal operational attitude and should not be considered otherwise limiting.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A gas turbine engine comprising:
a compressor section configured to compress a core flow;
a combustor section comprising a combustor, wherein the combustor is arranged downstream from the compressor section along a path of the core flow;
a turbine section arranged downstream from the combustor section along the path of the core flow, wherein the turbine section comprises a plurality of first vanes arranged at an outlet of the combustor, wherein each first vane of the plurality of first vanes comprises an internal vane path; and
an integral compressor diffuser arranged radially inward from the plurality of first vanes and integrated with the plurality of first vanes, the integral compressor diffuser arranged to diffuse and direct the entire core flow from the compressor section through the internal vane path,
wherein the path of the core flow, in a flow direction, passes through the compressor section, and the entire core flow is directed from the compressor section into and through the compressor diffuser and the internal vane path to provide internal back face cooling to the plurality of first vanes, wherein the internal vane paths are configured to expand and diffuse the core flow as it passes through the internal vane paths, and
wherein the entire core flow is directed from the internal vane paths into a combustor cavity that contains the combustor for combustion with fuel, and then the combusted air and fuel is directed between the plurality of first vanes to enter the turbine section.

2. The gas turbine engine of claim 1, wherein at least a portion of the compressor section is arranged radially inward from the combustor and at the same axial position as the combustor along an engine axis.

3. The gas turbine engine of claim 2, wherein the portion of the compressor section arranged radially inward from the combustor is part of a high pressure compressor.

4. The gas turbine engine of claim 2, wherein the portion of the compressor section arranged radially inward from the combustor is a high pressure compressor.

5. The gas turbine engine of claim 1, wherein the combustor cavity comprises an outer subcavity, a forward subcavity, and an inner subcavity, wherein compressed air supplied through the internal vane path fills each of the outer subcavity, the forward subcavity, and the inner subcavity.

6. The gas turbine engine of claim 5, wherein the inner subcavity is defined in a radial direction relative to an engine axis between an outer diameter surface of a part of the compressor section and an inner diameter surface of the combustor.

7. The gas turbine engine of claim 1, wherein the path of the core flow is in an axially aft direction through the compressor section, turned in a radially outward direction by the compressor diffuser, and flows radially outward through the internal vane path.

8. The gas turbine engine of claim 7, wherein the core flow path is turned to flow radially forward relative to the engine axis as it exits the internal vane path to surround the combustor and provide air thereto.

9. The gas turbine engine of claim 1, wherein the compressor diffuser is arranged axially aft of the combustor relative to an engine axis.

10. The gas turbine engine of claim 1, further comprising a fan arranged axially forward of the compressor section and configured to direct the core flow into the compressor section.

11. The gas turbine engine of claim 10, wherein the fan is configured to direct a bypass flow around an engine core that includes the compressor section, combustor section, and turbine section.

12. The gas turbine engine of claim 11, wherein the bypass flow is greater than the core flow.

13. The gas turbine engine of claim 1, wherein the compressor section comprises a low pressure compressor and a high pressure compressor, wherein the high pressure compressor is axially aft of the low pressure compressor relative to an engine axis.

14. The gas turbine engine of claim 13, wherein at least a portion of the high pressure compressor is arranged axially aligned with the combustor and radially inward from the combustor.

15. The gas turbine engine of claim 1, wherein the turbine section comprises a low pressure turbine and a high pressure turbine, wherein the high pressure turbine is axially forward of the low pressure turbine relative to an engine axis.

16. The gas turbine engine of claim 15, wherein the plurality of first vanes are a plurality of first vanes of the high pressure turbine.

17. A method of operating a gas turbine engine, the gas turbine engine comprising a compressor section, a combustor section, and a turbine section, wherein at least a portion of the compressor section is arranged axially aligned with a combustor of the combustor section and radially inward from the combustor, the method comprising:

compressing air of a core flow through the compressor section in an axially aft direction relative to an engine axis;

turning and diffusing the entire core flow output from the compressor section in a radial outward direction with an integral compressor diffuser that is integrally formed with a plurality of first vanes of the turbine section;

diffusing the entire core flow from the integral compressor diffuser through internal vane paths of the plurality of first vanes of the turbine section to provide back face cooling to the first vanes and to turn the core flow in a radial direction;

receiving the core flow from the internal vanes paths within a combustor cavity containing the combustor and combusting the core flow with fuel to generate hot combustion gas; and directing the hot combustion gas between the plurality of first vanes and into the turbine section.

18. The method of claim 17, wherein the core flow path is turned to flow axially forward relative to the engine axis as it exits the internal vane paths to surround the combustor within the combustor cavity and provide the core flow air to the combustor.

* * * * *